July 7, 1925.  1,545,271
T. NOLAN
SEMAPHORE SIGNAL FOR AUTOMOBILES
Filed Oct. 25, 1923

Inventor
Thomas Nolan
By
Attorney

Patented July 7, 1925.

1,545,271

UNITED STATES PATENT OFFICE.

THOMAS NOLAN, OF TACOMA, WASHINGTON.

SEMAPHORE SIGNAL FOR AUTOMOBILES.

Application filed October 25, 1923. Serial No. 670,776.

*To all whom it may concern:*

Be it known that I, THOMAS NOLAN, a citizen of the United States, residing at Tacoma, in the county of Pierce, State of Washington, have invented certain new and useful Improvements in Semaphore Signals for Automobiles, of which the following is a specification.

This invention relates to devices mounted on an automobile and adapted to indicate to a following car when the brakes are about to be, or are being, applied. The objects of the invention, are first, to provide such a device which is operatively connected to the brake-operating lever in such manner as to indicate " Caution " to the following car when the said lever is being brought into operative position, and " Stop " when the brake is being applied thereby; second, to provide an independent means whereby the connecting means is always kept taut, thus relieving the semaphore of the strain which it would otherwise have to apply to said connecting means; third, to provide means for illuminating said semaphore at night; fourth, to provide a novel form of semaphore arm indicating " Go " when the brakes are not being applied, and " Stop " when they are applied; and fifth, to provide a simple, cheap, and effective signal easy to install or repair and automatic in its action.

I attain these and other objects by the devices, mechanisms and arrangements illustrated in the accompanying drawings, in which—

Figure 1:
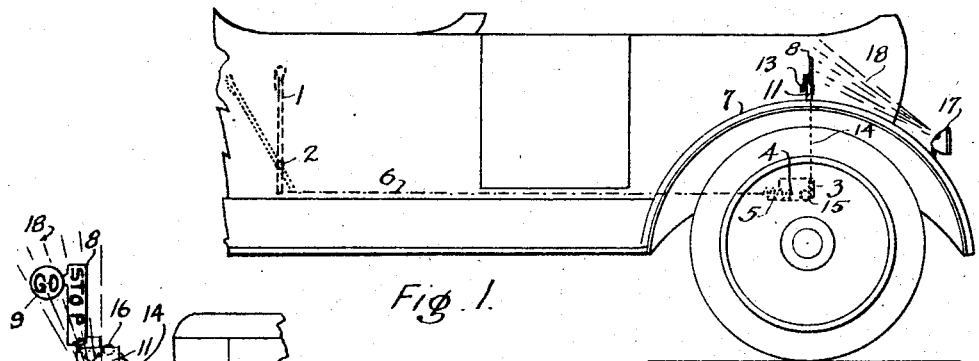
Figure 2:
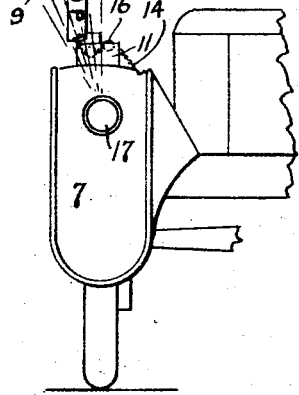
Figure 3:
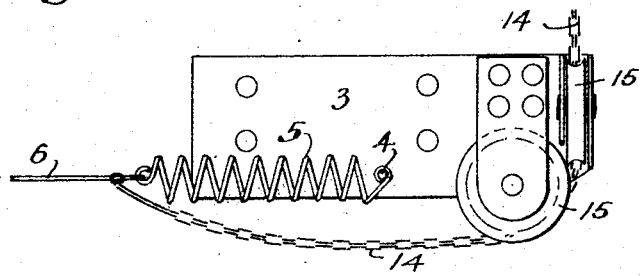
Figure 4:
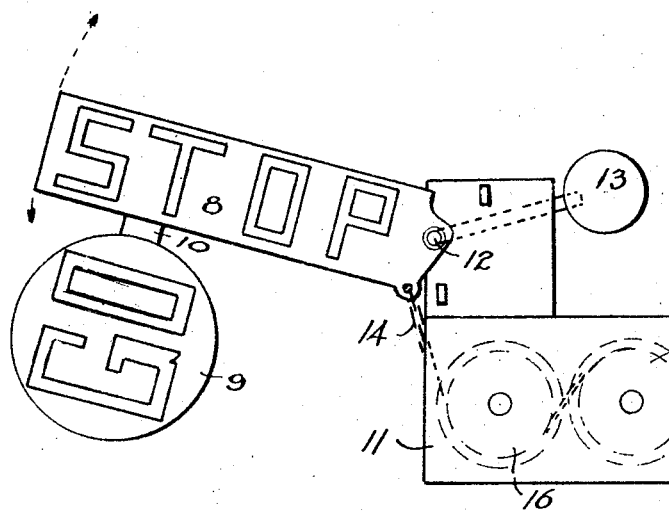

Fig. 1 is a diagrammatic view illustrating my device as mounted on an automobile; Fig. 2 is a rear view thereof, as seen from a following automobile, showing the semaphore as indicating no reduction in speed; Fig. 3 is an elevation of the tension apparatus on the car body; and Fig. 4 is a rear elevation of the semaphore and its mounting, showing the arm passing from " Caution " to " Stop " indicating positions.

Similar numerals of reference refer to similar parts throughout the several views.

As illustrated in the drawings this signal is operatively connected to the hand brake-lever of the automobile but it is to be understood that it may also be operated by a foot lever or pedal.

The lever 1 which operates the brake (not shown) is mounted in the usual manner and extends down below its fulcrum 2. A bracket 3 is mounted on the frame of the car near the rear thereof and is provided with a hook or lug 4. A bracket spring 5 is secured at one end to this lug 4 and is connected to the lower end of the lever 1 by means of a wire 6. Thus the spiral by means of a wire 6. Thus the spiral spring 5 always keeps the wire 6 taut and the rear end of the wire moves in accord with the lower end of the lever 1.

The semaphore signal is preferably mounted at the top of the left rear wheel guard 7 of the machine and comprises a specially shaped compound arm which is mounted on a pivot at its right end, as viewed from the rear. This arm is composed of two parts 8 and 9, the main part 8 being substantially an elongated rectangle adapted to be horizontal when the brakes are applied, vertical when they are released, and at an intermediate angle when the brake lever 1 is drawn back almost to applying position. The part 8 has the word " Stop," or any similar word, prominently painted on its rearward surface and is preferably colored red with the letters in white. The lettering of the word " Stop " is positioned and arranged so that when the arm 8 is horizontal said letters will stand erect and the word will be readily readable from the rear. The second part 9 of the semaphore arm is preferably in the form of a circle extending down from a short connecting strip 10 from the lower side of the said part 8 when in its horizontal position, and therefore extending to the left of the said part 8 when it is in its vertical position. This part 9 is painted with the word " Go," or other word of similar meaning, and the letters thereof are upright when the said semaphore arm 8 is in vertical position.

The said semaphore arm is mounted in a bracket 11 secured to the top of the wheel guard 7. The bracket 11 is provided with a suitable pivot pin 12 for the semaphore. The semaphore arm 8 is returned to the vertical position when not being pulled down by the brake lever 1, by means of a counterweight 13 mounted thereon in such position as to turn the arm up when it is released; or a spring (not shown) may engage the arm and the bracket 11 to return it to its vertical position.

The semaphore is operated by means of a length of chain or wire 14, extending from the rear end of the wire 6 to the semaphore arm, adjacent to the pivot 12, said chain 14 passing over suitable guide pulleys 15 mounted in the frame bracket 3 and other guide pulleys 16 in the semaphore bracket 11. These pulleys 15 and 16 are positioned and arranged in such manner as to transfer the pull of the wire 6 to the arm 8.

Though I prefer to arrange the parts in such proportion that the motion of the wire 6, when the brake lever is moved from released to applied positions, is just sufficient to swing the semaphore arm down from the vertical to horizontal positions, yet with some cars it is not convenient to attach the wire 6 very close to the fulcrum 2 of the lever 1. In such cases I attach the chain 14 to some other part of the spring 5, instead of to the wire 6, and thus obtain a proportionately less motion of the said chain 14, depending on the point on the spring 5 at which the chain is connected.

It is evident that the counterweight 13, or its equivalent spring, only has to raise the semaphore signal arm and keep the short length of chain 14 taut and that therefore it can be of comparatively small dimensions. In order to illuminate the semaphore I make a small hole in the front upper portion of the casing of a rear lamp 17, in such position that the rays thereof, indicated at 18, will shine on and illuminate the semaphore arm.

Having described my invention, what I claim is:—

1. In a semaphore signal for automobiles, the combination of a brake-operating lever; a semaphore signal arm pivotally mounted on the automobile; means for counterbalancing the semaphore arm to turn it on its pivot from horizontal to raised or vertical position; a spring attached at one end to the automobile and at the other end connected by intermediate means to said brake-operating lever, whereby said spring keeps the intermediate means taut; and flexible means connecting the moving portion of said spring with the semaphore arm whereby when the brake lever is operated and the spring extended the said semaphore arm will be lowered against the action of said counterbalancing means.

2. A semaphore signal for automobiles as set forth in claim 1, wherein said semaphore signal arm is of compound form, the main part being an elongated arm while the secondary part is a circular adjunct thereto, said secondary part being positioned below the main part when said main part is in horizontal position.

THOMAS NOLAN.